(12) United States Patent  (10) Patent No.: US 8,028,081 B2
Kandekar et al.  (45) Date of Patent: Sep. 27, 2011

(54) SYSTEM AND METHOD FOR ADAPTIVE SEGMENT PREFETCHING OF STREAMING MEDIA

(75) Inventors: Kunal Kandekar, Raleigh, NC (US); Richard J. Walsh, Raleigh, NC (US); Alfredo C. Issa, Apex, NC (US); Ravi Reddy Katpelly, Durham, NC (US)

(73) Assignee: Porto Technology, LLC, Wilmington, DE (US)

( * ) Notice: Subject to any disclaimer, the term of this patent is extended or adjusted under 35 U.S.C. 154(b) by 285 days.

(21) Appl. No.: 12/126,169

(22) Filed: May 23, 2008

(65) Prior Publication Data

US 2009/0292819 A1  Nov. 26, 2009

(51) Int. Cl.
  *G06F 15/16* (2006.01)
(52) U.S. Cl. ........................................ 709/231; 709/232
(58) Field of Classification Search ........... 709/231–235
  See application file for complete search history.

(56) References Cited

U.S. PATENT DOCUMENTS

| | | | |
|---|---|---|---|
| 5,818,439 A | 10/1998 | Nagasaka et al. | |
| 6,463,508 B1 * | 10/2002 | Wolf et al. | 711/133 |
| 6,711,741 B2 | 3/2004 | Yeo | |
| 6,907,570 B2 | 6/2005 | Amir et al. | |
| 7,080,392 B1 | 7/2006 | Geshwind | |
| 7,127,736 B2 | 10/2006 | Kondo et al. | |
| 7,293,280 B1 | 11/2007 | Gupta et al. | |
| 7,320,137 B1 | 1/2008 | Novak et al. | |
| 2002/0083459 A1 | 6/2002 | Kondo et al. | |
| 2004/0250281 A1 | 12/2004 | Feininger et al. | |
| 2004/0268398 A1 | 12/2004 | Fano et al. | |
| 2005/0060757 A1 | 3/2005 | Suh | |
| 2005/0183015 A1 | 8/2005 | Dunton | |
| 2005/0196153 A1 | 9/2005 | Bullwinkle et al. | |
| 2006/0015895 A1 | 1/2006 | Stone | |
| 2006/0098942 A1 | 5/2006 | Kim et al. | |
| 2006/0282859 A1 | 12/2006 | Garbow et al. | |
| 2007/0050827 A1 | 3/2007 | Gibbon et al. | |
| 2008/0022005 A1 * | 1/2008 | Wu et al. | 709/231 |
| 2008/0310814 A1 * | 12/2008 | Bowra et al. | 386/46 |

OTHER PUBLICATIONS

Sung-Ju Lee et al., "An Interactive Video Delivery and Caching System Using Video Summarization," available from http://www.hpl.hp.com/personal/Sung-Ju_Lee/abstracts/papers/, Jun. 2001, 9 pages.
"CNN.com—Breaking News, U.S., World, Weather, Entertainment & Video News," http://www.cnn.com/, printed Aug. 13, 2009, 2 pages.
"Yahoo!," http://www.yahoo.com, copyright 2009 Yahoo! Inc., 1 page.
"ABC News: Online news, breaking news, feature stories and more," http://www.abcnews.go.com, copyright 2009 ABCNews Internet Ventures, printed Jan. 23, 2009, 2 pages.
"TV Network for Primetime, Daytime and Late Night Television Shows—NBC Official Site," http://www.nbc.com, copyright 2009 NBC Universal, Inc., printed Aug. 13, 2009, 14 pages.

* cited by examiner

*Primary Examiner* — Yemane Mesfin
(74) *Attorney, Agent, or Firm* — Winthrow & Terranova, PLLC

(57) ABSTRACT

Systems and methods are provided for obtaining look-ahead segments for a streaming media item during playback such that the viewer can easily skip to the look-ahead segments without experiencing any substantial interruption or delay in playback. In general, a streaming media source begins streaming a media item to a streaming media client for playback. In one embodiment, the streaming media client selects one or more segments of the media item as one or more look-ahead segments to prefetch from the streaming media source. Then, while the media item is being streamed to the streaming media client for playback, the streaming media client prefetches the one or more look-ahead segments of the media item from the streaming media source. The look-ahead segments are thereafter utilized to enable the viewer to skip ahead in playback without experiencing a substantial interruption or delay in playback.

21 Claims, 11 Drawing Sheets

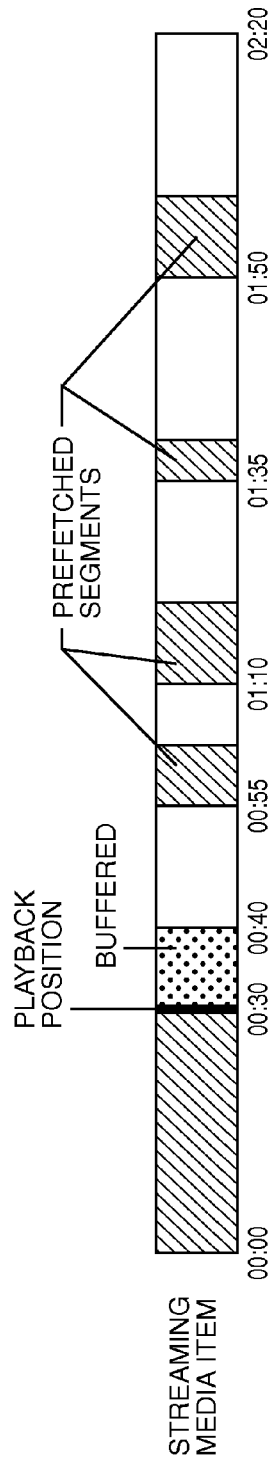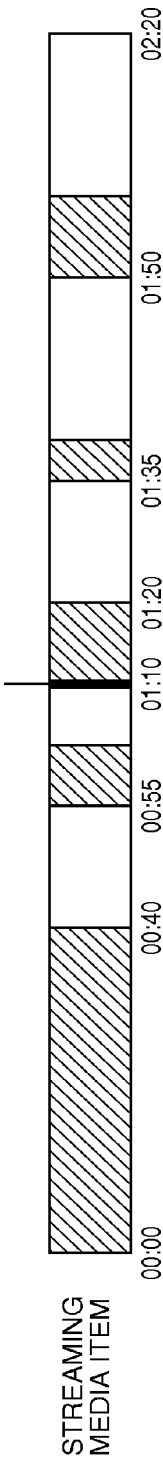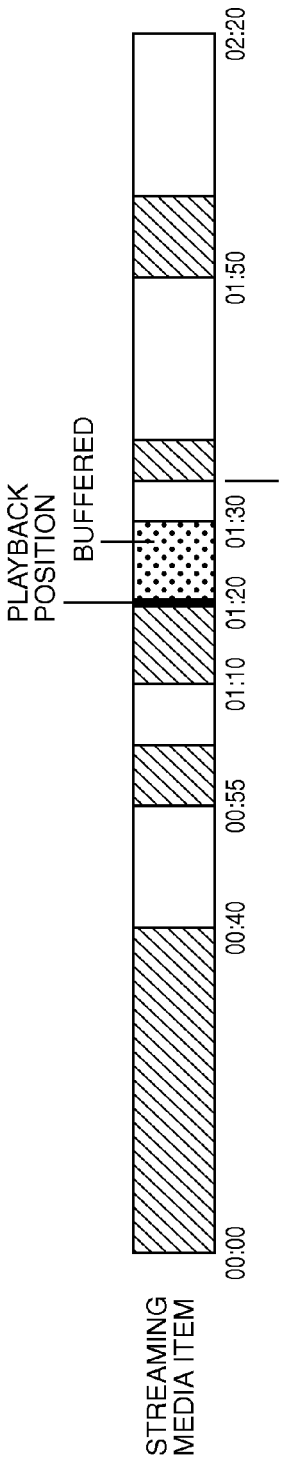

SYSTEM AND METHOD FOR ADAPTIVE SEGMENT PREFETCHING OF STREAMING MEDIA

FIELD OF THE INVENTION

The present invention relates to streaming media content.

BACKGROUND OF THE INVENTION

Numerous streaming media services are available. For example, web sites such as those provided by Yahoo!, CNN, ABC, NBC, and the like provide streaming video content. During playback of a streaming media item, users often desire to skip over portions of the streaming media item or to skip ahead to a desired portion of the media item. However, streaming media items are streamed linearly. As such, when a user skips ahead, the portion of the streaming media item to which the user has skipped may not be available depending on the amount of the streaming media item that has been buffered. For example, a user may be viewing a streaming video for which the upcoming five minutes have been buffered. Thus, if the user skips ahead to a desired location in the streaming media item beyond the five minutes that have been buffered, playback is interrupted and a delay is incurred in order to request, receive, and buffer a sufficient amount of the streaming media item to enable playback of the streaming media starting at the desired location. Thus, there is a need for a system and method that enables a user to skip ahead in a streaming media item without experiencing any substantial interruption in playback or delay.

SUMMARY OF THE INVENTION

The present invention relates to obtaining look-ahead segments for a streaming media item during playback such that the viewer can easily skip to the look-ahead segments without experiencing any substantial interruption or delay in playback. In general, a streaming media client requests a media item from a streaming media source. In response, the streaming media source begins streaming the media item to the streaming media client, and playback of the stream of the media item by the streaming media client begins. In one embodiment, in order to enable the viewer to seamlessly skip forward during playback of the stream of the media item, the streaming media client selects one or more segments of the media item as one or more look-ahead segments to prefetch from the streaming media source. The one or more look-ahead segments are segments of the media item that have not already been streamed to the streaming media client. In addition, the look-ahead segments are preferably segments of the media item that are determined to be of interest to the viewer or potentially of interest to the viewer. Then, while the media item is being streamed to the streaming media client for playback, the streaming media client prefetches the one or more look-ahead segments of the media item from the streaming media source.

Thereafter, if the viewer desires to skip ahead to one of the look-ahead segments, the streaming media client switches playback to the look-ahead segment, which has been prefetched and stored in local storage. While the look-ahead segment is being played from local storage, the streaming media client requests streaming of the media item starting at a point corresponding to an end of the look-ahead segment, or a portion of the look-ahead segment stored in the local storage. The stream of the media item starting at the requested starting point is then received and buffered while the look-ahead segment is being played from local storage. When playback of the look-ahead segment, or the portion of the look-ahead segment stored in local storage, is complete, the streaming media client switches playback to the stream of the media item starting at the requested starting point.

In another embodiment, rather than the streaming media client selecting and prefetching the look-ahead segments, the streaming media source may select the look-ahead segments and push the look-ahead segments to the streaming media client. In yet another embodiment, a proxy selects the look-ahead segments. The proxy may then prefetch the look-ahead segments and push the look-ahead segments to the streaming media client. Alternatively, the proxy may either instruct the streaming media source to push the look-ahead segments to the streaming media client or instruct the streaming media client to prefetch the look-ahead segments from the streaming media source.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 5:
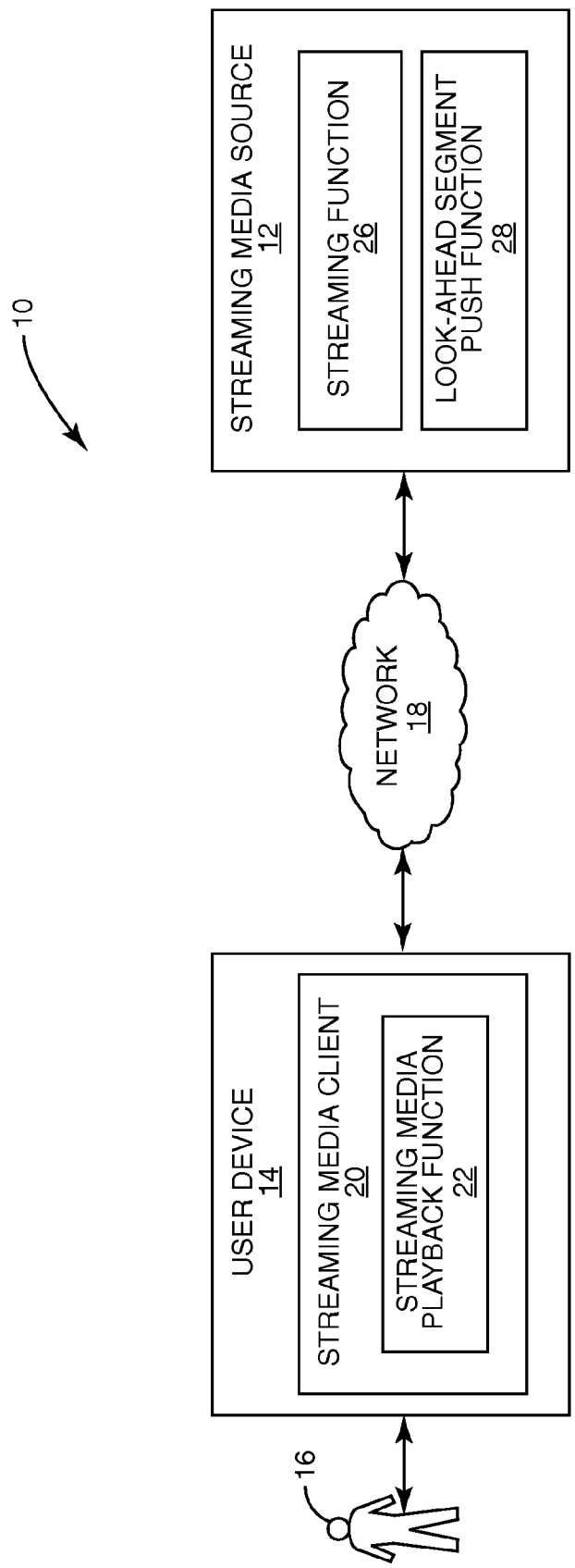
Figure 6:
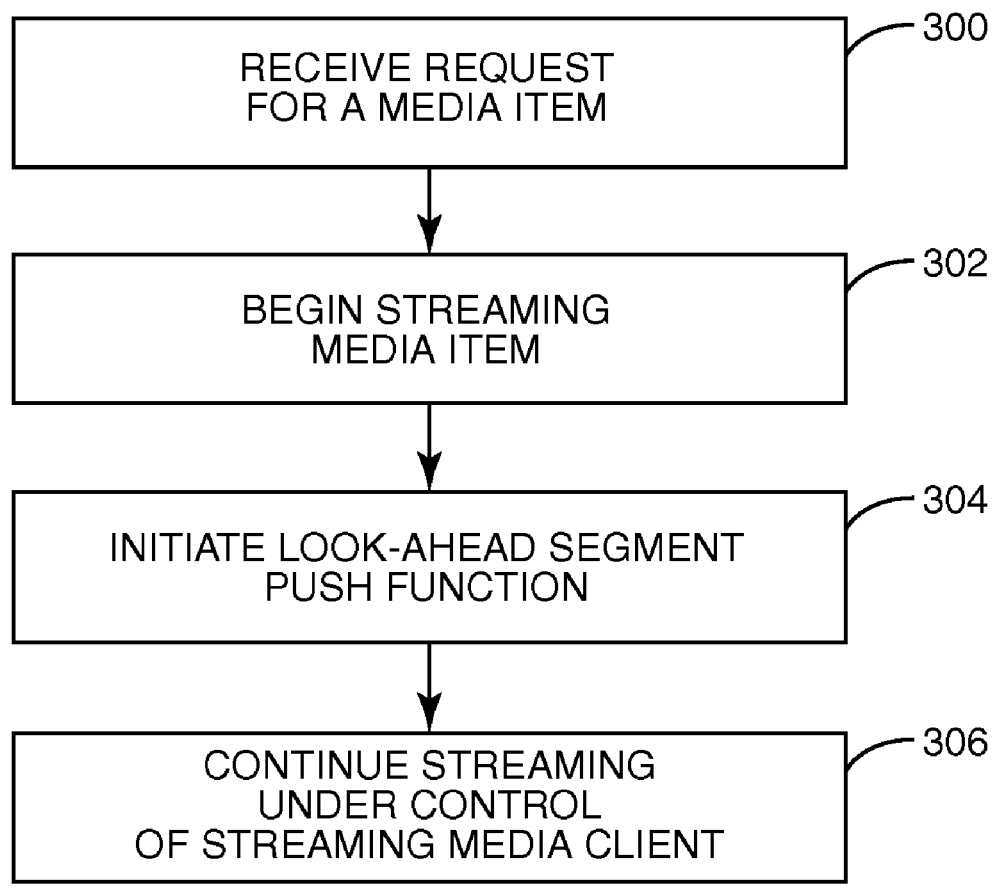
Figure 7:
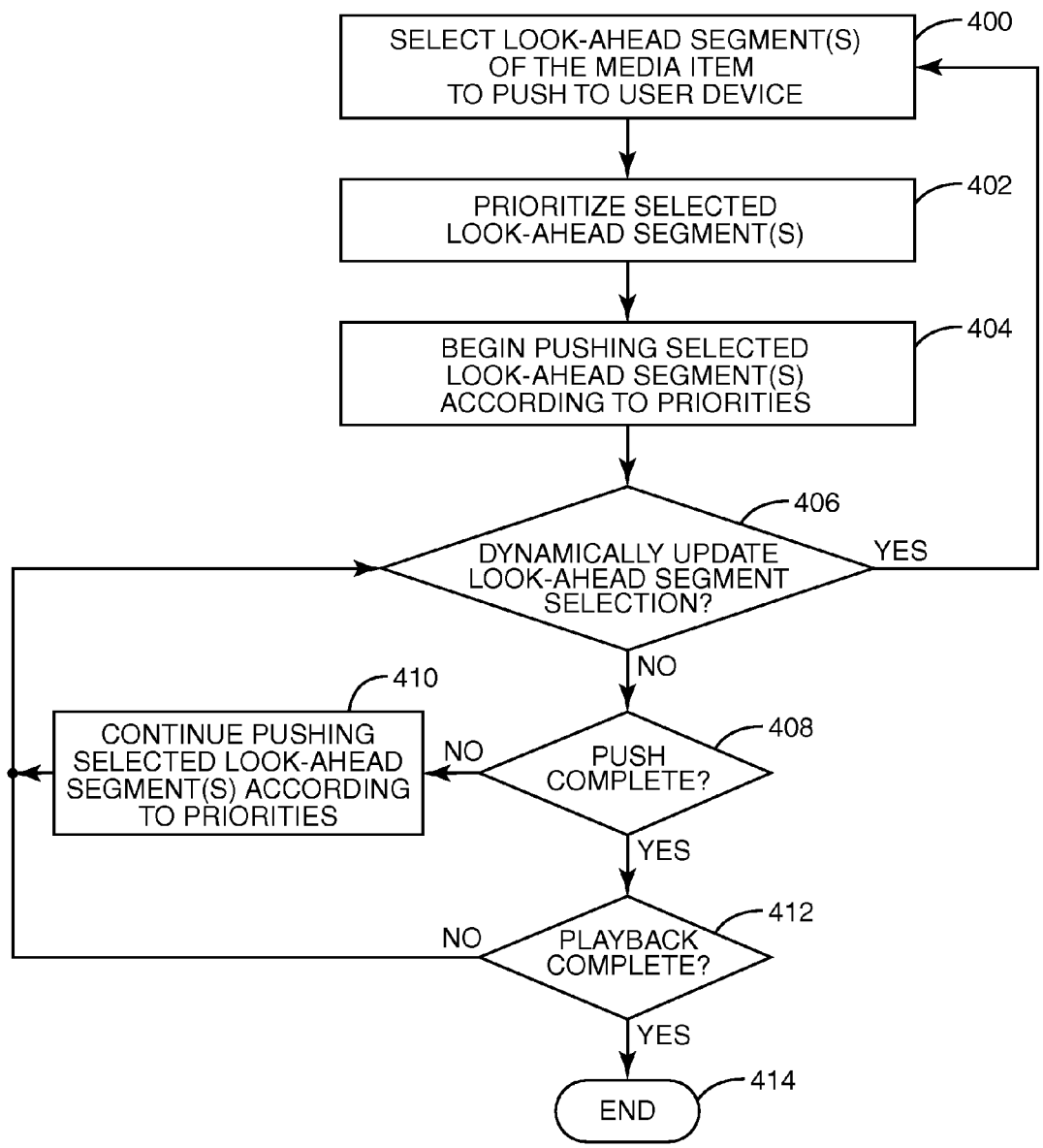
Figure 8:
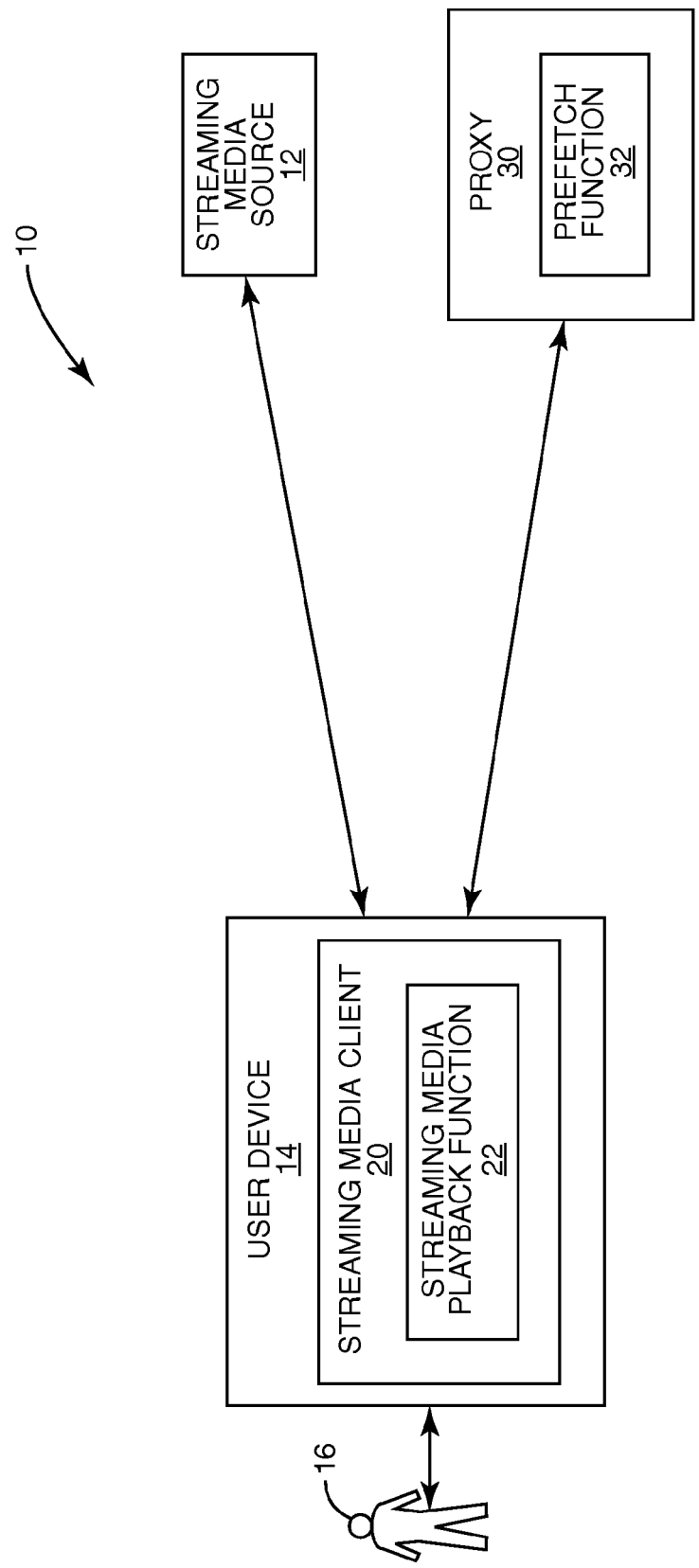
Figure 9:
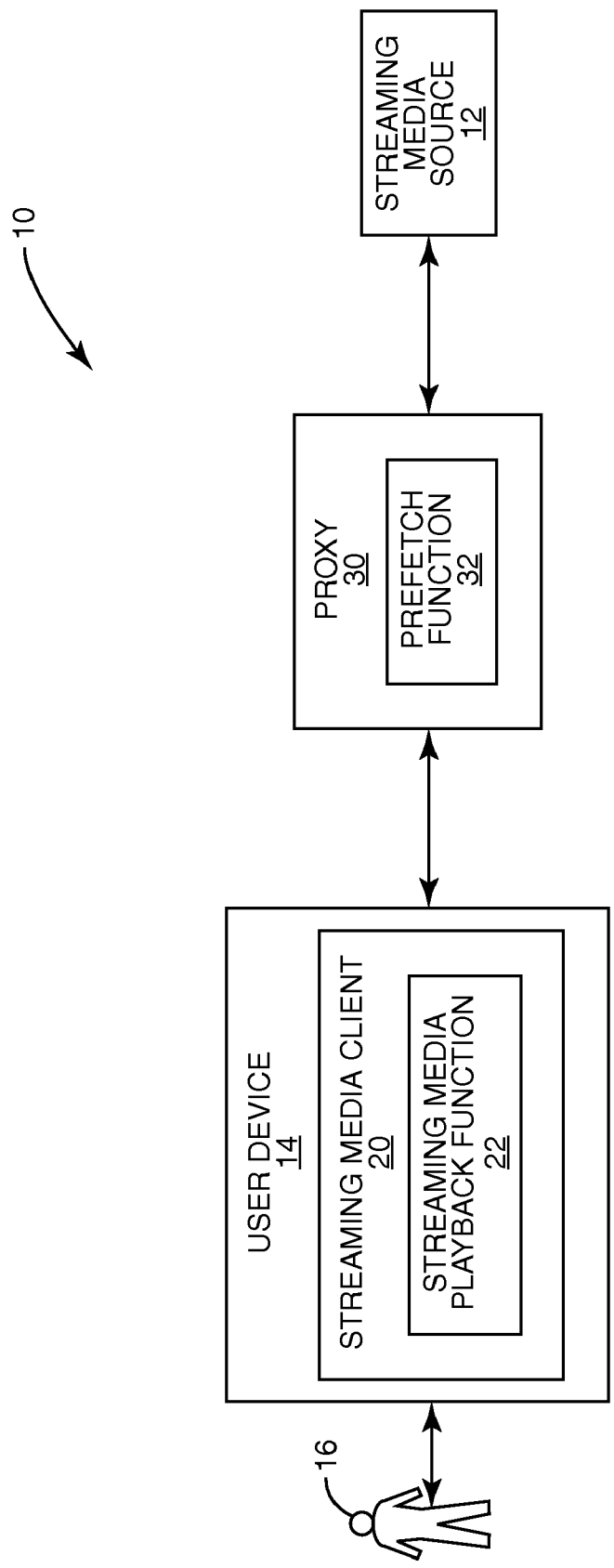
Figure 11:
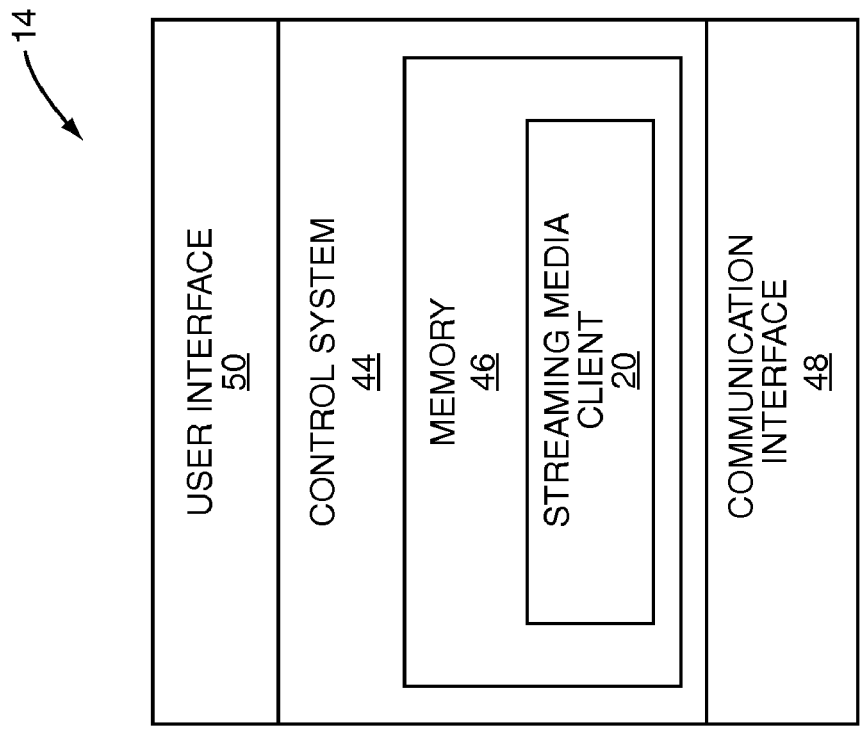
Figure 10:
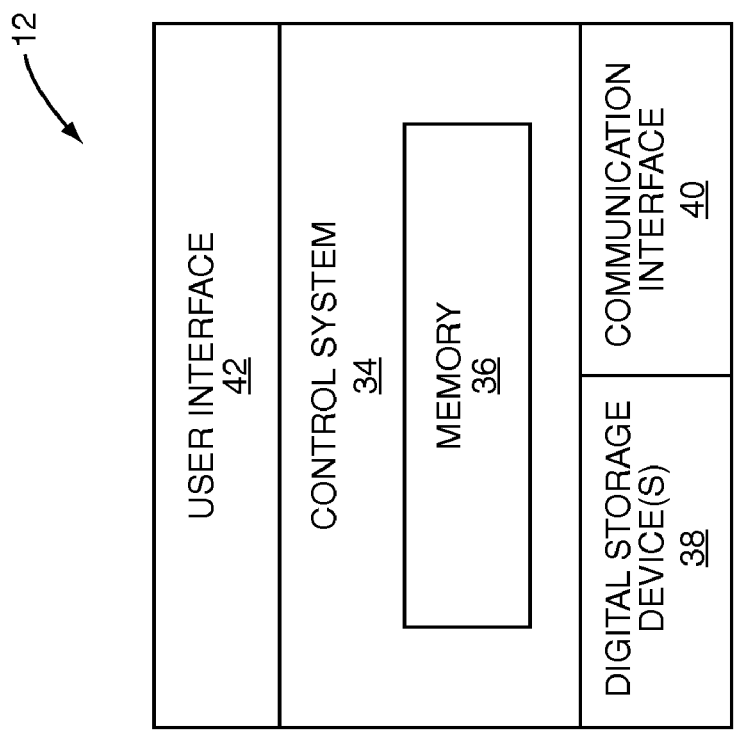
Figure 12:
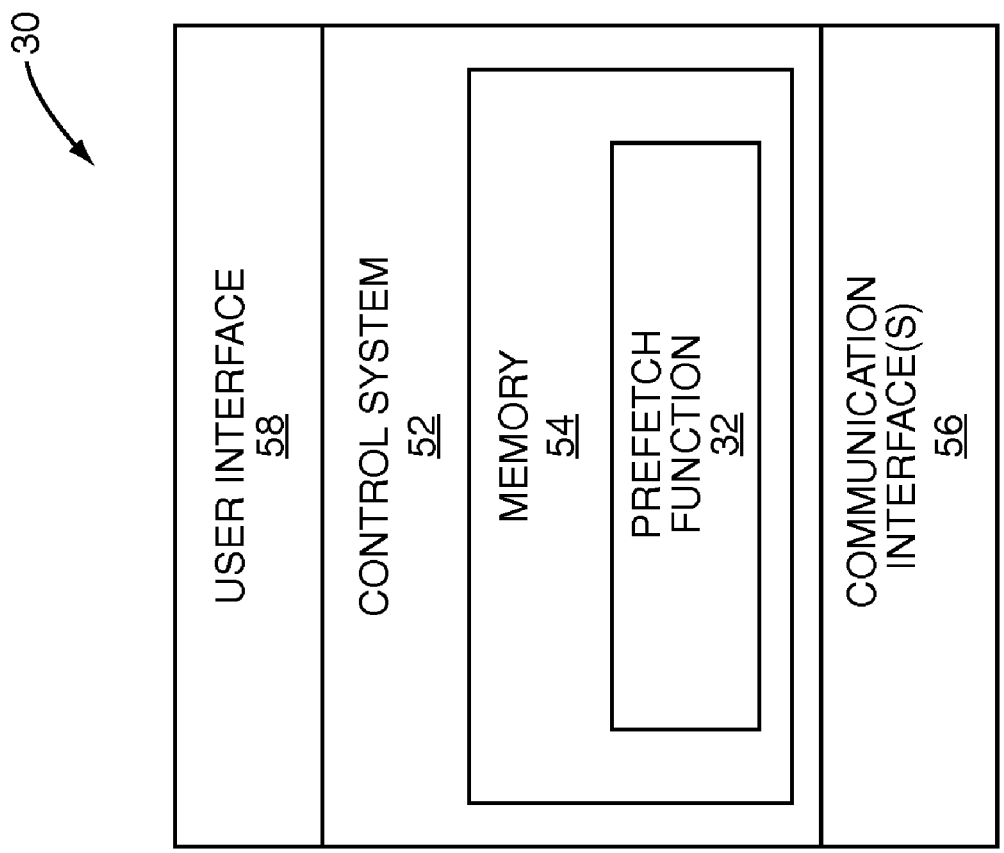

FIGS. 4A-4C graphically illustrate a process for utilizing the look-ahead segments to provide seamless playback when the viewer skips ahead to one of the look-ahead segments according to one embodiment of the present invention;

FIG. 5 illustrates a system for pushing one or more look-ahead segments for a streaming media item from a streaming media source to a streaming media client according to a second embodiment of the present invention;

FIG. 6 is a flow chart illustrating the operation of the streaming function of the streaming media source of FIG. 5 according to one embodiment of the present invention;

FIG. 7 is a flow chart illustrating the operation of the look-ahead segment push function of the streaming media source of FIG. 5 according to one embodiment of the present invention;

FIG. 8 illustrates a system for selecting and providing look-ahead segments to a streaming media client using a proxy according to a third embodiment of the present invention;

FIG. 9 illustrates a system for selecting and providing look-ahead segments to a streaming media client using a proxy according to a fourth embodiment of the present invention;

FIG. 10 is a block diagram of a streaming media source according to one embodiment of the present invention;

FIG. 11 is a block diagram of a user device including a streaming media client according to one embodiment of the present invention; and FIG. 12 is a block diagram of a proxy according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
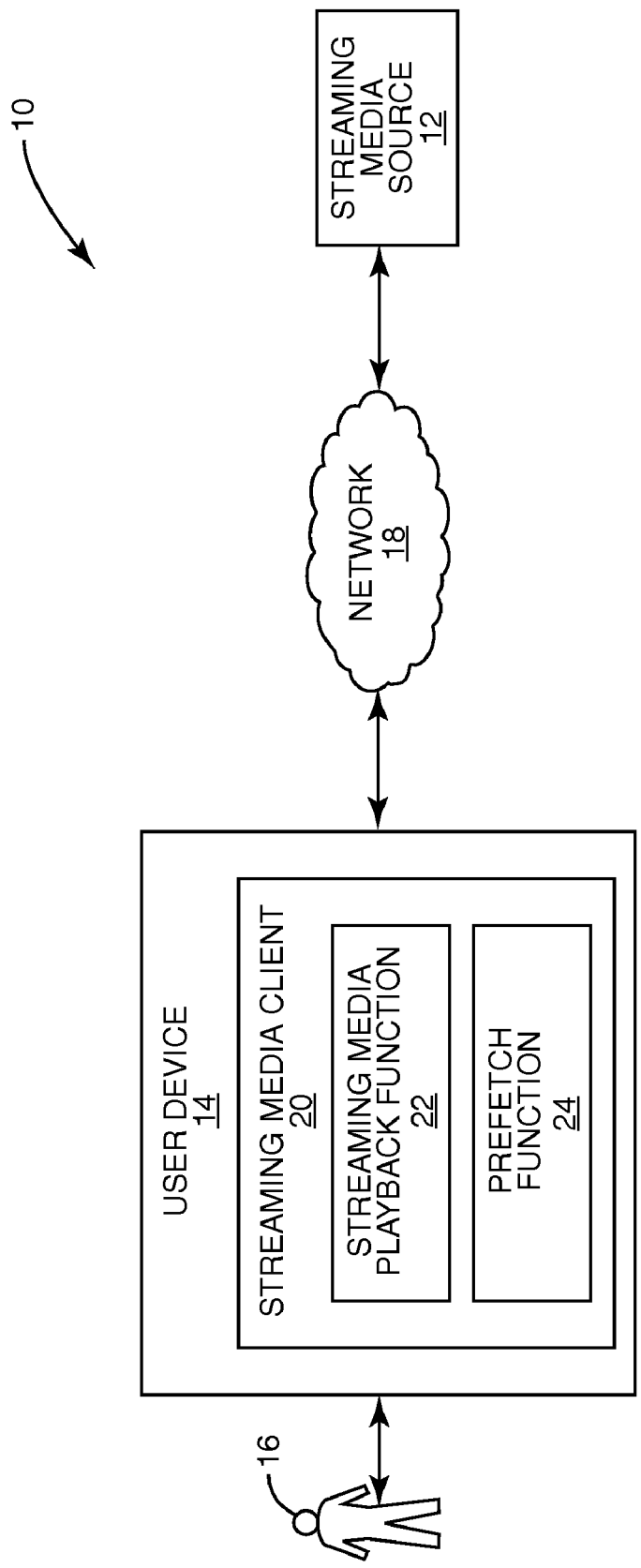
FIG. 1 illustrates a system for prefetching one or more look-ahead segments for a streaming media item according to a first embodiment of the present invention.

FIG. 1 illustrates a system 10 enabling adaptive prefetching of streaming media according to one embodiment of the present invention. In general, the system 10 includes a streaming media source 12 and a user device 14 having an associated user 16. The streaming media source 12 is connected to the user device 14 via a network 18. The network 18 may be any type of Wide Area Network (WAN) or Local Area Network (LAN), or any combination thereof. In addition, the network 18 may include wired components, wireless components, or a combination thereof. For example, the network 18 may be the Internet. As another example, the network 18 may be a Cable Television (CATV) network.

The streaming media source 12 may be any type of source that streams media content over the network 18. The media content may be media items such as, for example, movies, television programs, video clips, user-generated videos, broadcast or multicast radio programs, songs, audio books, or the like. As an example, the streaming media source 12 may be an Internet Protocol (IP) server that hosts media items and streams those media items to user devices such as the user device 14 upon request. As another example, the streaming media source 12 may be a headend in a CATV network providing a streaming television service such as a Video On Demand (VOD) service. As a final example, the streaming media source may be another user device, referred to herein as a peer device, operating to stream a media item to the user device 14 via the network 18 or a number of peer devices that operate to stream a media item to the user device 14 via the network 18 in a collaborative fashion.

The user device 14 may be any type of user device capable of receiving streaming media content from the streaming media source 12 via the network 18. For example, the user device 14 may be a personal computer, mobile telephone such as a mobile smart phone, a set-top box, or the like. The user device 14 includes a streaming media client 20. The streaming media client 20 may be implemented in software, hardware, or a combination thereof. The streaming media client 20 includes a streaming media playback function 22 and a prefetch function 24. The streaming media playback function 22 generally operates to send a request to the streaming media source 12 to begin streaming of a desired media item to the user device 14, receive the stream of the media item, and provide playback of the stream of the media item under the control of the user 16. The prefetch function 24 generally operates to select one or more segments, which are hereinafter referred to as "look-ahead segments," of the media item that are of interest to the user 16 or are potentially of interest to the user 16. The look-ahead segments are segments of the media item that have not already been streamed to the user device 14. Once look-ahead segments are selected, the prefetch function 24 operates to prefetch the one or more look-ahead segments, or desired amounts thereof, from the streaming media source 12, as discussed below. As a result, if the user 16 desires to skip ahead in playback of the stream of the media item beyond a point that is buffered to one of the look-ahead segments, playback may seamlessly continue with essentially no interruption or delay.

Figure 2:
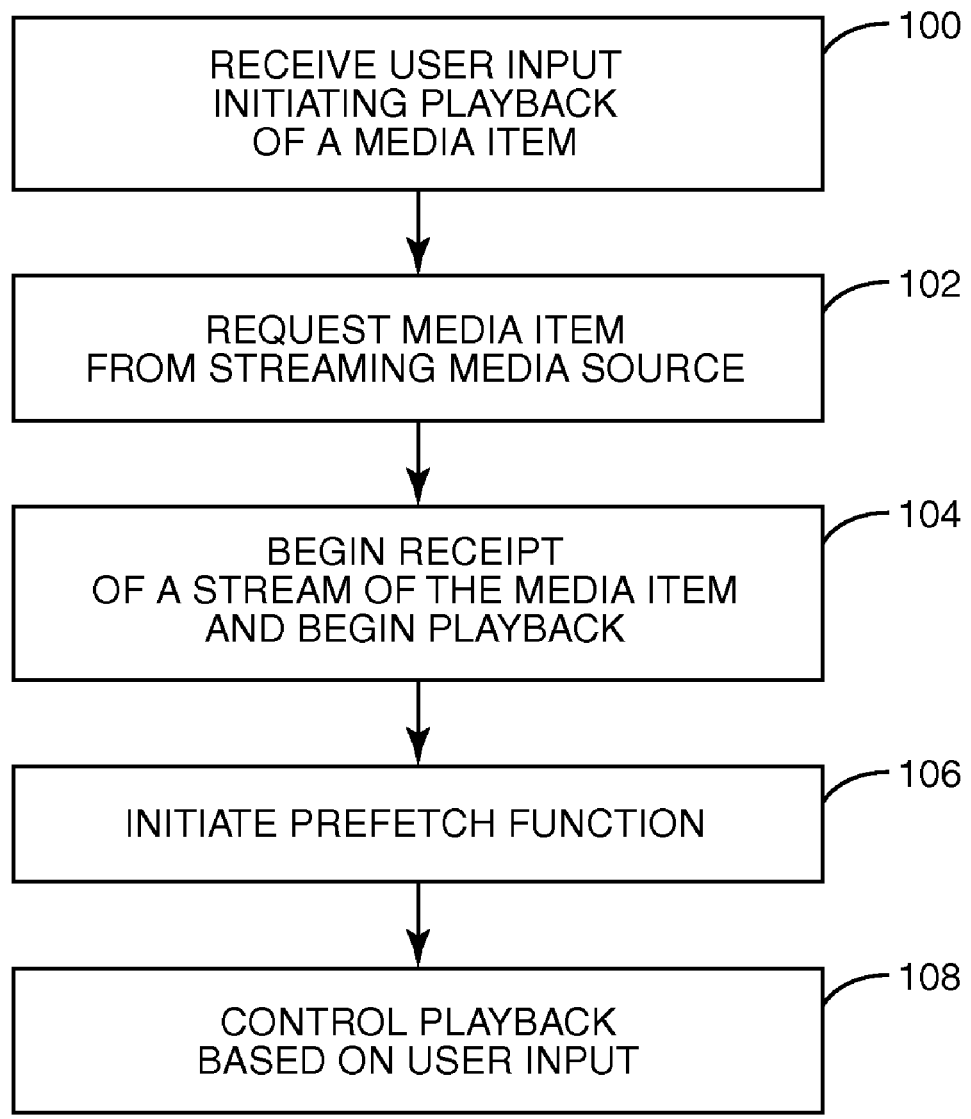
FIG. 2 is a flow chart illustrating the operation of the streaming media playback function of FIG. 1 according to one embodiment of the present invention.

FIG. 2 illustrates the streaming media playback function 22 of the streaming media client 20 of FIG. 1 according to one embodiment of the present invention. First, in this embodiment, the streaming media playback function 22 receives user input from the user 16 initiating playback of a media item (step 100). For example, in one embodiment, the streaming media client 20 may be implemented as a plug-in for an Internet browser. The user 16 may interact with the Internet browser to navigate to a website corresponding to the streaming media source 12. The user 16 may then select a media item for playback. As another example, the streaming media client 20 may present a menu of available media items to the user 16. More specifically, if the user device is, for example, a set-top box, an Electronic Programming Guide (EPG) or similar menu may be presented to the user 16 providing a list of media items available for playback via VOD. The user 16 may then select a desired media item for playback from the menu.

Next, the streaming media playback function 22 requests the media item from the streaming media source 12 (step 102). In response, the streaming media source 12 begins streaming the requested media item to the user device 14 via the network 18. In addition, as discussed below, the streaming media source 12 may provide metadata or information identifying and describing a number of segments of the media item, historical playback information for a number of users that have previously viewed the media item, heuristics or settings from a provider of the media item such as an operator of the streaming media source 12 or a creator of the media item, information regarding bandwidth requirements for the media item or segments of the media item, or the like. This information may be utilized by the prefetch function 24, as discussed below.

The streaming media playback function 22 begins receiving a stream of the media item from the streaming media source 12 and begins playback of the media item at the user device 14 (step 104). In addition, the streaming media playback function 22 initiates the prefetch function 24 (step 106). Once initiated, the prefetch function 24 generally operates to select and prefetch one or more look-ahead segments of the media item from the streaming media source 12, as discussed below. The streaming media playback function 22 then controls playback of the stream of the media item based on user input (step 108). For example, the user 16 may pause, rewind, fast-forward, skip-ahead, or the like.

Note that, as discussed below, prefetching the one or more look-ahead segments enables the user 16 to skip ahead in playback of the media item beyond a point which has been buffered according to traditional streaming techniques without any substantial interruption or delay. Likewise, the user 16 is enabled to skip backward in playback to segments that have not already been streamed and buffered according to traditional streaming techniques without any substantial interruption or delay. Also, in one embodiment, the streaming media client 20 may provide an indication to the user 16 as to which segments of the media item have been prefetched. For example, in the scrubber of the media playback screen which is typically used to show the current point in playback of the media item, the streaming media client 20 may insert markers identifying the look-ahead segments that have been prefetched such that the user 16 can easily control playback to skip to one of the look-ahead segments if desired. As another example, the streaming media client 20 may provide key frames indicative of the segments that have been prefetched, previews of the segments that have been prefetched, or the like. Note that as will be appreciated by one of ordinary skill in the art upon reading this disclosure, there are numerous variations in the manner in which the prefetched segments are indicated to the user 16. The examples given above are not intended to limit the scope of the present invention.

Figure 3:
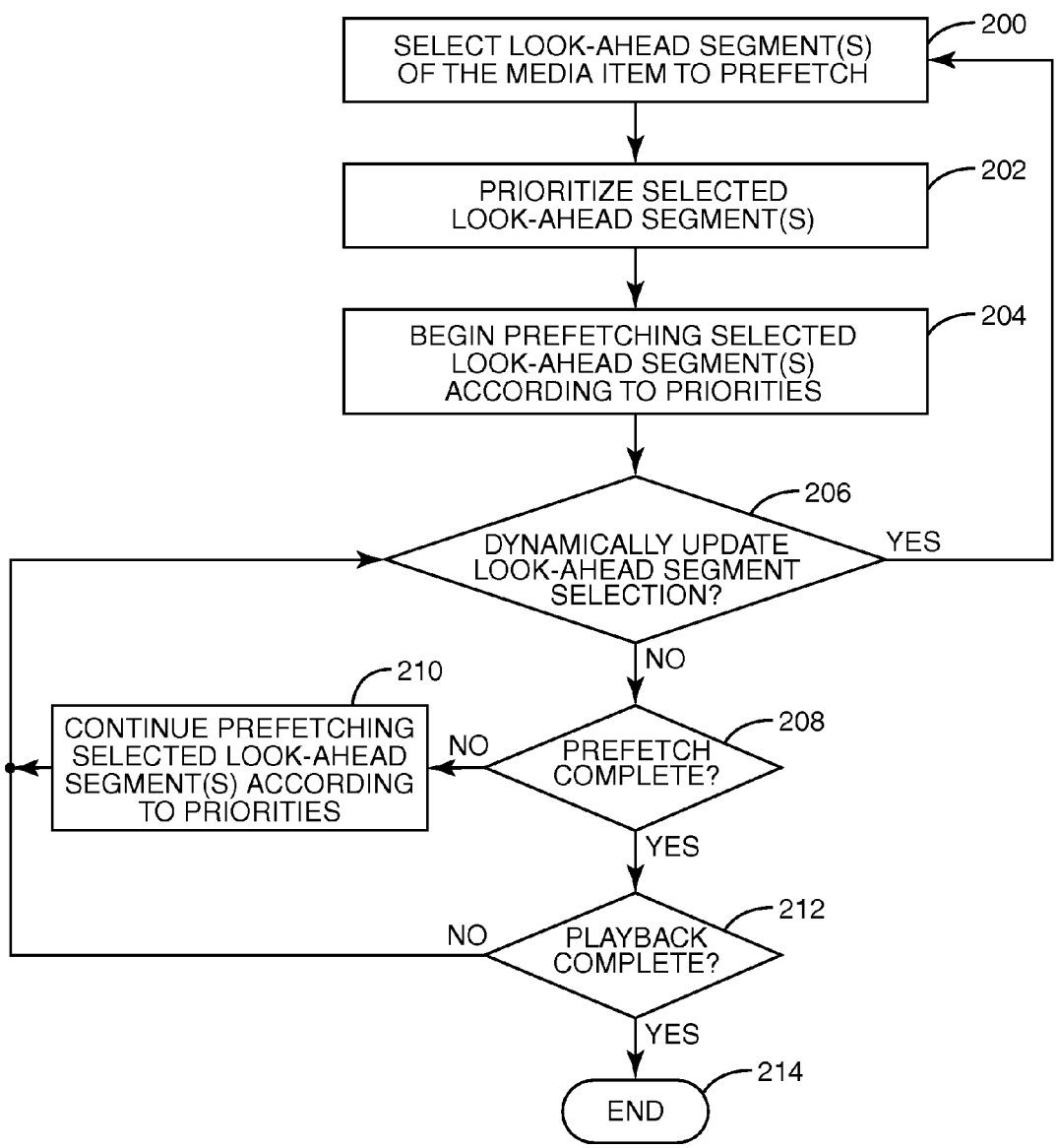
FIG. 3 is a flow chart illustrating the operation of the prefetch function of FIG. 1 according to one embodiment of the present invention.

FIG. 3 illustrates the operation of the prefetch function 24 of the streaming media client 20 of FIG. 1 according to one embodiment of the present invention. Once initiated by the streaming media playback function 22, the prefetch function 24 first selects one or more segments of the media item to prefetch (step 200). The one or more selected segments are referred to as look-ahead segments. In general, the look-ahead segments are segments of the media item that have not yet been streamed to the user device 14. Note that much of the discussion herein focuses on look-ahead segments being segments of the media item beyond a point that has been streamed to the user device 14. However, the present invention is not limited thereto. The look-ahead segments may also be segments of the media item prior to a current point in playback of the media item that have not yet been streamed to the user device 14. For example, if the user 16 skips ahead in playback of the media item, at least some portion of the media item skipped over may not yet have been streamed to the user device 14. Thus, one or more segments of this prior portion of the media item that have not yet been streamed to the user device 14 may be identified as look-ahead segments and, therefore, prefetched or otherwise obtained as discussed herein. Further, the look-ahead segments are preferably segments of the media item that are determined to be of interest to the user 16 or potentially of interest to the user 16. The prefetch function 24 may use any appropriate technique to determine which segments of the media item are of interest to the user 16 or are potentially of interest to the user 16. Several exemplary schemes for determining which segments of the media item are of interest to the user 16 or are potentially of interest to the user 16 are discussed below. However, the present invention is not limited thereto.

In one embodiment, the prefetch function 24 first obtains information identifying and describing a number of segments of the media item. The information identifying and describing the segments of the media item may be obtained from a remote source such as, for example, the streaming media source 12. For each segment, the information identifying and describing the segments of the media item includes information identifying a point in playback of the media item corresponding to a starting point of the segment and, optionally, a point in playback of the media item corresponding to the ending point of the segment. In a first embodiment, the segments of the media item are predefined by a producer or creator of the media item. In a second embodiment, the streaming media source 12 identifies the segments of the media item. More specifically, the streaming media source 12 may perform a frame analysis process to identify the segments of the media item. For example, the frame analysis may detect dark frames, such as essentially black frames, and determine that the dark frames represent a transition from one segment of the media item to another segment of the media item. In addition or alternatively, the media source 12 may identify the segments of the media item by analyzing metadata and/or annotations available for the media item. For example, the producer or creator of the media item may provide metadata for the media item that describes the content of the media item but does not explicitly identify the segments of the media item. The streaming media source 12 may analyze the metadata to identify the segments of the media item. In addition or alternatively, users that have previously viewed the media item may create annotations for the media item, and the streaming media source 12 may analyze the annotations to identify the segments of the media item. In a third embodiment, the streaming media source 12 may identify the segments by dividing the media item into segments according to a desired segment playback length or data size or divide the media item into a defined number of segments of equal playback length or data size.

In addition, for each segment, the information identifying and describing the segment includes information describing the content of the segment of the media item. For example, the information may describe the segment as containing an action scene, a romantic scene, or the like. As another example, if the media item is one of the Star Wars movies, the information may describe the content of the segment more specifically as containing a Princess Leia scene, a Darth Vader scene, a droid scene, a space-fighting scene, or the like. As another example, the information describing the segment may include a list of actors or actresses appearing in the segment and/or a description of activities that take place in the segment. The information describing the content of the segments of the media item may be information provided by a producer or creator of the media item, information such as annotations provided by one or more users that have previously viewed the media item, or the like, or any combination thereof.

Once the information identifying and describing the segments of the media item is obtained, the prefetch function 24 selects one or more look-ahead segments to prefetch from the segments of the media item based on one or more criteria. The one or more criteria may be, for example, user preferences defined by the user 16, actions taken by the user 16 during the current playback of the media item, a playback history of the user 16 for one or more previous playbacks of the media item, playback history for the user 16 for one or more other media items, a playback history of one or more users that have previously viewed the media item, a playback history of one or more other users in a social network of the user 16 that have previously viewed the media item, heuristics or settings provided by the streaming media source 12 and/or the producer or creator of the media item, information contained in a user profile of the user 16 maintained by a social networking service such as, for example, a social networking website, bandwidth availability and bandwidth requirements for obtaining the segments of the media item, or the like.

The user preferences defined by the user 16 may, for example, include one or more keywords associated with content in which the user 16 has an interest, names of one or more actors or actresses in which the user 16 has an interest, names of one or more characters in a particular media item in which the user 16 has an interest, types of scenes in which the user 16 has an interest, or the like. The prefetch function 24 may compare the user preferences of the user 16 to the information describing the segments of the media item to select the look-ahead segments to be prefetched from the streaming media source 12.

As discussed below, the actions taken by the user 16 during the current playback of the media item may be utilized by the prefetch function 24 to select the look-ahead segments to prefetch from the streaming media source 12. For example, if the user 16 skips to a particular segment of the media item and then views that segment, the prefetch function 24 may select similar segments of the media item as look-ahead segments to prefetch from the streaming media source 12. Note that a priority assigned to the segment skipped to by the user 16 as well as priorities assigned to similar segments of the media item may be increased. Similarly, if the user 16 skips over a particular segment of the media item, the prefetch function 24 may ensure that similar segments of the media item are not selected as look-ahead segments to prefetch from the streaming media source 12 or may reduce the priority assigned to similar segments.

The prefetch function 24 may additionally or alternatively use the playback history of the user 16 for one or more previous playbacks of the media item to select the look-ahead segments to prefetch from the streaming media source 12. More specifically, the playback history may identify segments of the media item previously viewed by the user 16, skipped by the user 16, skipped to by the user 16, or the like. The prefetch function 24 may then identify segments of the media item previously skipped to and viewed by the user 16 in the one or more previous playbacks of the media item as look-ahead segments to prefetch from the streaming media source 12.

The prefetch function 24 may additionally or alternatively use the playback history of the user 16 for one or more other media items. Again, the playback histories may identify segments of the media items viewed by the user 16, segments of the other media items skipped by the user 16, segments of the other media items skipped to by the user 16, or the like. As an example, the prefetch function 24 may then identify segments of the media item that are similar to segments of the other media item previously skipped to and viewed by the user 16 as look-ahead segments to prefetch from the streaming media source 12.

In a similar manner, the prefetch function 24 may use playback histories for previous playbacks of the media item by one or more other users or one or more other users within a social network of the user 16 to select the look-ahead segments to prefetch from the streaming media source 12. Again, the playback histories of the other users may identify segments of the media item previously viewed by the other users, skipped by the other users, skipped to by the other users, or the like. In general, the prefetch function 24 may then identify segments of the media that were of interest to the other users, not of interest to the other users, or the like. For example, segments of the media item previously skipped to and viewed by a threshold number or percentage of the other users may be identified as segments of interest to the other users. The prefetch function 24 may then identify segments of the media item previously skipped to and viewed by a threshold number or percentage of the other users as look-ahead segments to prefetch from the streaming media source 12. Note that, in another embodiment, the playback histories of the other users may be weighted based on, for example, degree of separation from the user 16 in the social network of the user 16, similarity of profiles of the other users and the profile of the user 16, or the like. The weighting may then be considered when determining whether, for example, segments skipped to and viewed by the other users are likely of interest to the user 16.

In addition or alternatively, the prefetch function 24 may select the one or more look-ahead segments to prefetch from the streaming media source 12 based on heuristics or settings provided by the streaming media source 12. The heuristics or settings may be defined by the streaming media source 12, a producer or creator of the media item, or the like. The heuristics or settings may define one or more segments to be prefetched for all users. In addition or alternatively, the heuristics or settings may include one or more rules defining segments to be prefetched for classes of users. A class of users may be defined based on demographic information, geographic information, records of media items previously viewed by the users, or the like. For example, the heuristics or settings may include one or more rules stating that action scenes are to be prefetched for male users in the age range of 20-40 years old. Thus, when selecting look-ahead segments based on such heuristics, the prefetch function 24 may first select a class of users from the classes of users defined by the heuristics to which the user 16 belongs. One or more of the segments identified for the class of users to which the user 16 belongs may then be selected as the look-ahead segments.

Still further, the prefetch function 24 may also consider information contained in a user profile of the user 16 hosted by a social networking service such as a social networking website. The profile of the user 16 may identify a favorite actor or actress of the user 16, a favorite movie of the user 16 from which the interests of the user 16 may be inferred, a favorite movie or television character of the user 16, or the like.

Lastly, the prefetch function 24 may also consider bandwidth availability and bandwidth required to obtain the segments of the media item. More specifically, in one embodiment, the information describing the segments may also include information enabling the prefetch function 24 to estimate bandwidth requirements for downloading the segments of the media item. The prefetch function 24 may determine the number of segments to select based on the bandwidth available for prefetching as compared to the bandwidth requirements for the segments of the media item. Initially, when playback begins, all of the available bandwidth may be used to buffer a sufficient amount of the stream of the media item to begin playback of the media item. Once a sufficient amount of the stream of the media item is buffered, the bandwidth allocated to receiving the stream of the media item may be reduced to an amount that is sufficient to continue playback. The excess bandwidth may then be allocated to prefetching. Thus, based on the amount of bandwidth allocated to prefetching and the bandwidth requirements for prefetching the segments of the media item, the prefetch function 24 may determine the number of segments that can be prefetched and/or select which segments are to be prefetched.

After the look-ahead segments to prefetch are selected, the look-ahead segments are prioritized (step 202). Note that the selection and prioritization of the look-ahead segments may be a single process or separate processes depending on the implementation. In general, the prefetch function 24 may prioritize the look-ahead segments based on the criteria used to select the look-ahead segments. For example, the prefetch function 24 may assign a highest priority to look-ahead segments selected based on user actions taken by the user 16 during the current playback of the media item, a lesser priority to look-ahead segments selected based on the playback history of the user 16 for one or more previous playbacks of the media item, an even lesser priority for look-ahead segments selected based on the user preferences of the user 16 and the playback history of the user 16 for other media items, and a lowest priority to all other look-ahead segments.

In an alternative embodiment, the user 16 may define a list of keywords corresponding to user preferences of the user 16 and assign priorities to the keywords. The look-ahead segments may then be selected based on a comparison of the keywords to the information describing the content of the look-ahead segments of the media item and prioritized based on the priorities assigned to the keywords. In addition, additional keywords related to the keywords defined by the user 16 by an ontology, taxonomy, or similar data structure may be used in selecting the look-ahead segments.

The prefetch function 24 then begins prefetching the look-ahead segments from the streaming media source 12 according to the assigned priorities (step 204). Prefetching of the look-ahead segments may be performed by a single process or separate processes. The amount of available bandwidth assigned to each of the look-ahead segments may be controlled based on the priority assigned to the look-ahead segments. Note that the amount of available bandwidth assigned to each of the look-ahead segments may additionally or alternatively be controlled based on various other criteria as will be appreciated by one of ordinary skill in the art. In a first embodiment, the prefetch function 24 prefetches the complete segments from the streaming media source 12. In a second embodiment, the prefetch function 24 prefetches a defined amount of each look-ahead segment such as the first X minutes or the first Y bytes. In a third embodiment, the prefetch function 24 determines, for each look-ahead segment, an amount of the look-ahead segment that should be prefetched to enable playback to skip to that segment and continue playback from the beginning of that segment without resulting in any substantial interruption or delay in playback. In a fourth embodiment, the prefetch function 24 may prefetch a lower-quality version of the look-ahead segments than that of the media item itself in order to reduce the bandwidth requirements for prefetching. In a fifth embodiment, the media item may be available in a number of layers where a lowest layer is a lowest quality version of the media item, a highest layer is a highest quality version of the media item, and a number of intermediate layers provide corresponding intermediate quality versions of the media item. When prefetching the look-ahead segments, for each look-ahead segment, the layer prefetched by the prefetch function 24 may be selected based on the priority of the look-ahead segment.

After prefetching has begun, in this embodiment, the prefetch function 24 periodically determines whether the segments selected for prefetching should be updated as a result of user actions taken by the user 16 during playback of the stream of the media item (step 206). As discussed above, the selection of the look-ahead segments may be based on user actions taken by the user 16 during playback of the stream of the media item such as, for example, skipping over a segment of the media item, skipping ahead to a segment of the media item, replaying a segment of the media item, or the like. Thus, in one embodiment, user actions may be recorded, and the prefetch function 24 may periodically check for user action occurrences and determine that the look-ahead segment selections are to be updated if relevant user actions have occurred. For example, if the user 16 has paused playback, then the prefetch function 24 may determine that the look-ahead segment selections are not to be updated. In contrast, if the user 16 has rewound playback to replay a particular segment, skipped over a particular segment, or skipped to a particular segment, the prefetch function 24 may determine that the look-ahead segment selections are to be updated. In an alternative embodiment, the prefetch function 24 may be notified of user actions and immediately or at some time thereafter determine whether the look-ahead segment selections are to be updated. If the look-ahead segment selections are to be updated, the process returns to step 200 such that the look-ahead segment selections are updated and priorities assigned to the look-ahead segments are updated. Alternatively, the process may return to step 202 to only re-prioritize the already selected look-ahead segments based on the user actions. The priorities may be updated based on user actions taken by the user 16 during playback of the stream of the media item such as, for example, skipping over a segment of the media item, skipping ahead to a segment of the media item, replaying a segment of the media item, or the like.

If the look-ahead segment selections are not to be updated, then the prefetch function 24 determines whether prefetching of the look-ahead segments is complete (step 208). Depending on the embodiment, prefetching may be complete when the selected look-ahead segments have been completely prefetched or when a sufficient amount of each look-ahead segment has been prefetched to enable uninterrupted playback. If prefetching is not complete, the prefetch function 24 continues to prefetch the look-ahead segments according to the assigned priorities (step 210) and then the process returns to step 206. If prefetching of the look-ahead segments is complete, in this embodiment, the prefetch function 24 determines whether playback is complete (step 212). If not, the process returns to step 206 where the prefetch function 24 monitors for user actions that are relevant to look-ahead segment selection. If a relevant user action occurs, new look-ahead segments may be selected and prefetched. Once playback is complete, the process ends (step 214). In an alternative embodiment, once prefetching of the look-ahead segments is complete, the prefetch function 24 may select new look-ahead segments to prefetch from the streaming media source 12. The same criteria for selecting the look-ahead segments may be used. However, any thresholds used for selecting the look-ahead segments based on the criteria may be reduced.

FIGS. 4A through 4C graphically illustrate prefetching of a number of look-ahead segments for a streaming media item according to one embodiment of the present invention. In this example, the media item has a total playback time of 2 hours and 20 minutes (02:20). The current playback position is at the thirty minute mark (00:30), as illustrated in FIG. 4A. According to traditional buffering techniques used for streaming media content, in this example, approximately the next ten minutes (00:30 to 00:40) of the stream of the media item have already been buffered. As such, the viewer may easily fast-forward or skip ahead up until approximately the forty minute (00:40) mark. However, using traditional streaming techniques, if the viewer were to fast-forward or skip ahead beyond, or even immediately prior to, the forty minute (00:40) mark, playback would be interrupted and a substantial delay would be incurred in order to request, buffer, and begin playback of a stream of the media item beginning at the requested point. In contrast, the present invention provides prefetching of a number of look-ahead segments that are of interest to the viewer or likely of interest to the viewer. As a result, the viewer may skip ahead to any of the look-ahead segments without experiencing an interruption in playback or any substantially delay.

For example, if the viewer skips ahead to the look-ahead segment starting at the 1 hour and 10 minute (1:10) mark as illustrated in FIG. 4B, the streaming media playback function 22 begins playback of the prefetched look-ahead segment from local storage of the user device 14. In addition, either prior to, as, or after playback of the prefetched look-ahead segment from local storage begins, the streaming media playback function 22 requests streaming of the media item starting at an end of the look-ahead segment, or an end of a portion of the look-ahead segment stored in local storage. Assuming that the entire look-ahead segment has been prefetched, the streaming media playback function 22 requests streaming of the media item starting at the end of the look-ahead segment, which in this example is approximately the 1 hour and 20 minute (1:20) mark. While the streaming media playback function 22 is playing the look-ahead segment from local storage, the streaming media playback function 22 receives a stream of the media item starting at approximately the 1:20 minute mark and begins buffering the stream of the media item. As a result, as shown in FIG. 4C, when playback reaches the end of the look-ahead segment stored in the local storage of the user device 14, playback switches to the stream of the media item starting at approximately the 1:20 minute mark.

At that point, enough of the stream of the media item has been buffered to enable seamless playback without any substantial interruption or delay.

FIG. 5 illustrates the system 10 wherein the look-ahead segments are selected by the streaming media source 12 and pushed to the user device 14 according to a second embodiment of the present invention. Again, the system 10 includes the streaming media source 12 and the user device 14 interconnected via the network 18. In this embodiment, the streaming media source 12 includes a streaming function 26 and a look-ahead segment push function 28, each of which may be implemented in software, hardware, or a combination thereof. The streaming function 26 generally operates to stream a requested media item to the user device 14. The look-ahead segment push function 28 generally operates to select one or more look-ahead segments for the media item being streamed to the user device 14 and preemptively push the selected look-ahead segments to the user device 14.

The user device 14 includes the streaming media client 20. However, in this embodiment, the streaming media client 20 does not include the prefetch function 24. The prefetch function 24 has been replaced with the look-ahead segment push function 28 of the streaming media source 12. The streaming media playback function 22 generally operates to send a request to the streaming media source 12 to begin streaming of a desired media item to the user device 14, receive the stream of the media item, and to provide playback of the stream of the media item under the control of the user 16.

FIG. 6 illustrates the operation of the streaming function 26 of the streaming media source 12 according to one embodiment of the present invention. First, the streaming function 26 receives a request for a media item from the user device 14 (step 300). The request may be sent by the user device 14 in response to user input from the user 16 selecting the media item for playback. In response, the streaming function 26 begins streaming the media item to the user device 14 (step 302). The streaming media playback function 22 of the user device 14 receives the stream of the media item and begins playback. In addition to beginning streaming of the media item, the streaming function 26 initiates the look-ahead segment push function 28 (step 304). As discussed below, the look-ahead segment push function 28 selects one or more segments of the media item as look-ahead segments to push to the user device 14 based on the criteria discussed above with respect to the prefetch function 24, prioritizes the look-ahead segments, and pushes the look-ahead segments to the user device 14.

Lastly, the streaming function 26 continues streaming the media item to the user device 14 under control of the streaming media client 20 (step 306). More specifically, the user 16 may choose to take various actions such as pausing, rewinding, fast-forwarding, skipping-ahead, and skipping-backward during playback of the media item. In response, the streaming media playback function 22 causes the desired action. For example, if the user 16 desires to skip ahead to one of the look-ahead segments, the streaming media playback function 22 begins playback of the look-ahead segment from local storage and, in one embodiment, sends a request to the streaming media source 12 to start streaming the media item from an end of the look-ahead segment or from an end of a portion of the look-ahead segment stored locally at the user device 14.

FIG. 7 illustrates the operation of the look-ahead segment push function 28 of the streaming media source 12 of FIG. 5 according to one embodiment of the present invention. Once initiated by the streaming function 26, the look-ahead segment push function 28 first selects one or more segments of the media item to push to the user device 14 (step 400). The one or more selected segments are referred to as look-ahead segments. In general, the look-ahead segments are segments of the media item that have not been streamed to the user device 14. The look-ahead segment push function 28 may use any appropriate technique to determine which segments of the media item are of interest to the user 16 or are potentially of interest to the user 16. Several exemplary schemes for determining which segments of the media item are of interest to the user 16 or are potentially of interest to the user 16 are discussed below. However, the present invention is not limited thereto.

In one embodiment, the look-ahead segment push function 28 first obtains information identifying and describing a number of segments of the media item. For each segment, the information identifying and describing the segments of the media item includes information identifying a point in playback of the media item corresponding to a starting point of the segment and, optionally, a point in playback of the media item corresponding to the ending point of the segment. In a first embodiment, the segments of the media are predefined by a producer or creator of the media item. As such, the information identifying the segments may be provided to the streaming media source 12 in association with the media item. For example, the information identifying the segments may be provided as metadata within a media file corresponding to the media item such as MPEG 7 annotations.

In a second embodiment, the streaming media source 12 identifies the segments of the media item. More specifically, the streaming media source 12 may perform a frame analysis process to identify the segments of the media item. For example, the frame analysis may detect dark frames, such as essentially black frames, and determine that the dark frames represent a transition from one segment of the media item to another segment of the media item. In addition or alternatively, the streaming media source 12 may identify the segments of the media item by analyzing metadata and/or annotations available for the media item. For example, the producer or creator of the media item may provide metadata for the media item that describes the content of the media item but does not explicitly identify the segments of the media item. The streaming media source 12 may analyze the metadata to identify the segments of the media item. In addition or alternatively, users that have previously viewed the media item may create annotations for the media item, and the streaming media source 12 may analyze the annotations to identify the segments of the media item. In a third embodiment, the streaming media source 12 may identify the segments by dividing the media item into segments according to a desired segment playback length or data size or divide the media item into a defined number of segments of equal playback length or data size.

In addition, for each segment, the information identifying and describing the segment includes information describing the content of the segment of the media item. For example, the information may describe the segment as containing an action scene, a romantic scene, or the like. As another example, if the media item is one of the Star Wars movies, the information may describe the content of the segment more specifically as containing a Princess Leia scene, a Darth Vader scene, a droid scene, a space-fighting scene, or the like. As another example, the information describing the segment may include a list of actors or actresses appearing in the segment and/or a description of activities that take place in the segment. The information describing the content of the segments of the media item may be information provided by a producer or creator of the media item and, for example, included within metadata associated with the media item, information such as annotations provided by one or more users that have previously viewed the media item, or the like, or any combination thereof.

Once the information identifying and describing the segments of the media item is obtained, the look-ahead segment push function 28 selects one or more look-ahead segments from the segments of the media item to push to the user device 14 based on one or more criteria. As discussed above with respect to the prefetch function 24, the one or more criteria may be, for example, user preferences defined by the user 16, actions taken by the user 16 during the current playback of the media item, a playback history of the user 16 for one or more previous playbacks of the media item, playback history for the user 16 for one or more other media items, a playback history of one or more users that have previously viewed the media item, a playback history of one or more other users in a social network of the user 16 that have previously viewed the media item, heuristics or settings of the streaming media source 12 and/or the producer or creator of the media item, information contained in a user profile of the user 16 maintained by a social networking service such as, for example, a social networking website, bandwidth availability and bandwidth requirements for obtaining the segments of the media item, or the like.

After the look-ahead segments to push to the user device 14 are selected, the look-ahead segments are prioritized (step 402). Note that the selection and prioritization of the look-ahead segments may be a single process or separate processes depending on the implementation. In general, the look-ahead segment push function 28 may prioritize the look-ahead segments based on the criteria used to select the look-ahead segments. For example, the look-ahead segment push function 28 may assign a highest priority to look-ahead segments selected based on user actions taken by the user 16 during the current playback of the media item, a lesser priority to look-ahead segments selected based on the playback history of the user 16 for one or more previous playbacks of the media item, an even lesser priority for look-ahead segments selected based on the user preferences of the user 16 and the playback history of the user 16 for other media item, and lowest priority to all other look-ahead segments.

The look-ahead segment push function 28 then begins pushing the look-ahead segments to the user device 14 according to the assigned priorities (step 404). Pushing of the look-ahead segments may be performed by one or more processes. The amount of available bandwidth assigned to each of the look-ahead segments may be controlled based on the priority assigned to the look-ahead segment. In a first embodiment, the look-ahead segment push function 28 pushes the complete look-ahead segments to the user device 14. In a second embodiment, the look-ahead segment push function 28 pushes a defined amount of each look-ahead segment such as the first X minutes or the first Y bytes. In a third embodiment, the look-ahead segment push function 28 determines, for each look-ahead segment, an amount of the look-ahead segment that should be pushed to enable playback at the user device 14 to skip to that segment and continue playback from the beginning of that segment without resulting in any substantial interruption or delay in playback. In a fourth embodiment, the look-ahead segment push function 28 may push a lower-quality version of the look-ahead segments than that of the media item itself in order to reduce the bandwidth requirements for pushing. In a fifth embodiment, the media item may be available in a number of layers where a lowest layer is a lowest quality version of the media item, a highest layer is a highest quality version of the media item, and a number of intermediate layers provide corresponding intermediate quality versions of the media item. When pushing the look-ahead segments, for each look-ahead segment, the layer pushed by the look-ahead segment push function 28 may be selected based on the priority of the look-ahead segment.

In this embodiment, the look-ahead segment push function 28 periodically determines whether the segments selected for pushing should be updated as a result of user actions taken by the user 16 during playback of the stream of the media item (step 406). As discussed above, the selection of the look-ahead segments may be based on user actions taken by the user 16 during playback of the stream of the media item such as, for example, skipping over a segment of the media item, skipping ahead to a segment of the media item, or the like. Thus, in one embodiment, user actions may be recorded, and the look-ahead segment push function 28 may periodically check for user action occurrences and determine that the look-ahead segment selections are to be updated if relevant user actions have occurred. In an alternative embodiment, the look-ahead segment push function 28 may be notified of user actions and immediately or at some time thereafter determine whether the look-ahead segment selections are to be updated. If the look-ahead segment selections are to be updated, the process returns to step 400 such that the look-ahead segment selections are updated and priorities assigned to the look-ahead segments are updated. Alternatively, the process may return to step 402 to only re-prioritize the already selected look-ahead segments based on the user actions.

If the look-ahead segment selections are not to be updated, then the look-ahead segment push function 28 determines whether pushing of the look-ahead segments is complete (step 408). If not, the look-ahead segment push function 28 continues to push the look-ahead segments according to the assigned priorities (step 410) and then the process returns to step 406. If pushing of the look-ahead segments is complete, in this embodiment, the look-ahead segment push function 28 determines whether playback is complete (step 412). If not, the process returns to step 406 where the look-ahead segment push function 28 monitors for user actions that are relevant to look-ahead segment selection. If a relevant user action occurs, new look-ahead segments may be selected and pushed to the user device 14. Once playback is complete, the process ends (step 414). In an alternative embodiment, once pushing of the look-ahead segments is complete, the look-ahead segment push function 28 may select new look-ahead segments to push to the user device 14. The same criteria for selecting the look-ahead segments may be used. However, any thresholds used for selecting the look-ahead segments based on the criteria may be reduced.

It should be noted that the look-ahead segment push function 28 may coordinate pushing of look-ahead segments to multiple user devices 14. For example, if multiple user devices 14 need the same look-ahead segments, the look-ahead segments may be pushed to the multiple user devices 14 via a multicast channel. As another example, two or more user devices 14 may be assigned to a multicast channel where look-ahead segments selected for all of the user devices 14 assigned to the multicast channel are pushed over the multicast channel. Each of the user devices 14 accepts look-ahead segments selected for it and ignores look-ahead segments selected only for the other user devices 14 on the multicast channel. Lastly, rather than pushing look-ahead segments to the user device 14, the look-ahead segment push function 28 may instruct the user device 14 to obtain the look-ahead segments from one or more other user devices 14 that already have those segments of the media item.

It should also be noted that while in the discussion above the look-ahead segment push function 28 pushes the selected look-ahead segments to the user device 14, the present invention is not limited thereto. In an alternative embodiment, the look-ahead segment push function 28 may push information identifying the selected look-ahead segments to the user device 14. The streaming media client 20 may then prefetch the selected look-ahead segments from the streaming media source 12, from another remote media source, another user device 14, or the like. It should also be noted that while FIGS. 1 and 5 illustrates two embodiments of the system 10, the present invention is not limited thereto. For example, in another embodiment, the selection and prioritization of the look-ahead segments may be a collaborative process performed by the streaming media source 12 and the streaming media client 20.

FIG. 8 illustrates the system 10 further including a proxy 30 according to a third embodiment of the present invention. In this embodiment, the system 10 includes the streaming media source 12, the user device 14, and the proxy 30, which are interconnected by a network such as the network 18 (FIGS. 1 and 5). This embodiment may be particularly beneficial where the user device 14 is a device having minimal computing capabilities such as, for example, a mobile telephone or the like.

The proxy 30 may generally be any device capable of connecting to the network 18 or any device forming part of the network. For example, if the user device 14 is a mobile device of the user 16, the proxy 30 may be a personal computer of the user 16. The proxy 30 includes a prefetch function 32, which may be implemented in software, hardware, or a combination thereof. The prefetch function 32 is substantially the same as the prefetch function 24 discussed above. In general, in this embodiment, the prefetch function 32 operates to select look-ahead segments for a media item being streamed to the user device 14, prefetch the look-ahead segments from the streaming media source 12, and push the prefetched look-ahead segments to the user device 14.

In operation, upon request by the user 16, the streaming media playback function 22 requests a desired media item from the streaming media source 12. In response, the streaming media source 12 begins streaming the media item to the user device 14. In addition, the streaming media client 20 notifies the proxy 30 of playback of the media item as well as any user actions taken by the user 16 during playback. Alternatively, if the proxy 30 is located between the user device 14 and the streaming media source 12, the proxy 30 may be enabled to observe data traffic to and from the user device 14 to determine when playback of the media item is occurring as well any user actions taken by the user 16 during playback. The prefetch function 32 of the proxy 30 then obtains information identifying and describing segments of the media item being streamed to the user device 14. Based on this information and one or more of the criteria discussed above, the prefetch function 32 selects one or more of the segments of the media item as look-ahead segments to prefetch from the streaming media source 12 and assigns priorities to the selected look-ahead segments. In this embodiment, the prefetch function 32 then prefetches the look-ahead segments from the streaming media source 12 and pushes the look-ahead segments to the user device 14. Note that, as discussed above, the look-ahead segment selections and/or the priorities assigned thereto may be updated in response to user actions taken by the user 16 during playback of the media item.

In an alternative embodiment, the proxy 30 may select the look-ahead segments and assign priorities to the look-ahead segments on behalf of the streaming media client 20. The proxy 30 may then provide information identifying the selected look-ahead segments and, optionally, priorities assigned to the look-ahead segments to the user device 14, where the streaming media client 20 then prefetches the selected look-ahead segments. Alternatively, the proxy 30 may provide information identifying the selected look-ahead segments and, optionally, priorities assigned to the look-ahead segments to the streaming media source 12, where the streaming media source 12 then pushes the selected look-ahead segments to the user device 14.

FIG. 9 illustrates the system 10 according to a fourth embodiment of the present invention. This embodiment is substantially the same as that shown in FIG. 8. However, in the system 10 of FIG. 9, the proxy 30 is an intermediary device located between the user device 14 and the streaming media source 12. For example, the proxy 30 may be an access point providing access to a network, such as the network 18, to the user device 14. The access point may be, for example, a base station in a mobile telecommunications network, an IEEE 802.11x access point, or the like. Note that since the proxy 30 is located between the user device 14 and the streaming media source 12, the user device 14 does not have to notify the proxy 30 of the media item that is being streamed to it or at least some types of user actions. However, for user actions that are transparent to the proxy 30, the streaming media client 20 of the user device 14 may report the user actions to the proxy 30. In operation, the proxy 30 operates to select and, optionally, prioritize look-ahead segments. The proxy 30 then prefetches the look-ahead segments and pushes the look-ahead segments to the user device 14, instructs the streaming media client 20 to prefetch the look-ahead segments, or instructs the streaming media source 12 to push the look-ahead segments to the streaming media client 20, as discussed above with respect to FIG. 8.

FIG. 10 is a block diagram of the streaming media source 12 according to one embodiment of the present invention. In general, the streaming media source 12 includes a control system 34 having associated memory 36. In one embodiment, the streaming function 26 and the look-ahead segment push function 28 (FIG. 5) are implemented in software and stored in the memory 36. However, the present invention is not limited thereto. The streaming media source 12 may also include one or more digital storage devices 38, such as one or more hard-disk drives, for storing media items available for streaming to user devices, such as the user device 14, over the network 18 (FIGS. 1 and 5). The streaming media source 12 also includes a communication interface 40 communicatively coupling the streaming media source 12 to, depending on the embodiment, the user device 14 and/or the proxy 30 via the network 18. Lastly, the streaming media source 12 may include a user interface 42, which may include components such as, for example, a display, one or more user input devices, or the like.

FIG. 11 is a block diagram of the user device 14 according to one embodiment of the present invention. In general, the user device 14 includes a control system 44 having associated memory 46. In one embodiment, the streaming media client 20 is implemented in software and stored in the memory 46. However, the present invention is not limited thereto. Note that, in one embodiment, the look-ahead segments are stored in the memory 46. Alternatively, while not illustrated, the user device 14 may include one or more digital storage devices, where the look-ahead segments are stored in the one or more digital storage devices. The user device 14 also includes a communication interface 48 communicatively coupling the user device 14 to, depending on the embodiment, the streaming media source 12 and/or the proxy 30 via the network 18 (FIGS. 1 and 5). Lastly, the user device 14 includes a user interface 50, which may include components such as, for example, a display, one or more user input devices, a speaker, one or more output ports for providing audio and/or video to an associated display, or the like.

FIG. 12 is a block diagram of the proxy 30 of FIGS. 8 and 9 according to one embodiment of the present invention. In general, the proxy 30 includes a control system 52 having associated memory 54. In one embodiment, the prefetch function 32 is implemented in software and stored in the memory 54. However, the present invention is not limited thereto. The proxy 30 also includes one or more communication interfaces 56 communicatively coupling the proxy 30 to the streaming media source 12 and the user device 14. Lastly, the proxy 30 may include a user interface 58, which may include components such as, for example, a display, one or more user input devices, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operation of a user device comprising:
   receiving a stream of a media item from a streaming media source;
   providing playback of the stream of the media item;
   obtaining one or more look-ahead segments of the media item, wherein the one or more look-ahead segments are one or more segments of the media item that have not yet been streamed to the user device selected based on information that describes content of the one or more look-ahead segments and wherein the information is not indicative of a location of the one or more look-ahead segments in the media item; and
   storing the one or more look-ahead segments in local storage of the user device;
   wherein obtaining the one or more look-ahead segments of the media item comprises:
      selecting the one or more look-ahead segments based on the information that describes the content of the one or more look-ahead segments; and
      prefetching the one or more look-ahead segments from the streaming media source; and
   wherein selecting the one or more look-ahead segments comprises selecting the one or more look-ahead segments from a plurality of segments of the media item that have not yet been streamed to the user device based on a comparison of information describing content of the plurality of segments of the media item and user preferences of a user of the user device.

2. The method of claim 1 wherein at least one look-ahead segment of the one or more look-ahead segments is a segment of the media item beyond that which is being streamed to the user device at a time the at least one look-ahead segment is obtained.

3. The method of claim 1 wherein at least one look-ahead segment of the one or more look-ahead segments is a segment of the media item prior to a current point in playback of the media item that has not yet been streamed to the user device at a time at which the at least one look-ahead segment is obtained.

4. The method of claim 1 further comprising:
   receiving user input from the user of the user device instructing the user device to skip to a look-ahead segment of the one or more look-ahead segments during playback of the stream of the media item;
   providing playback of the look-ahead segment from the local storage;
   requesting a stream of the media item starting at a point corresponding to an end of the look-ahead segment stored in the local storage;
   receiving the stream of the media item starting at the point corresponding to the end of the look-ahead segment stored in the local storage from the streaming media source while providing playback of the look-ahead segment from the local storage such that the stream of the media item starting at the point corresponding to the end of the look-ahead segment stored in the local storage is buffered while providing playback of the look-ahead segment from the local storage; and
   transitioning playback from the look-ahead segment to the stream of the media item starting at the point corresponding to the end of the look-ahead segment stored in the local storage once playback of the look-ahead segment from the local storage is complete.

5. The method of claim 1 wherein obtaining the one or more look-ahead segments of the media item further comprises adaptively updating the one or more segments selected as the one or more look-ahead segments.

6. The method of claim 1 wherein obtaining the one or more look-ahead segments of the media item further comprises adaptively updating the one or more segments selected as the one or more look-ahead segments based on at least one user action taken by the user of the user device during playback of the stream of the media item.

7. The method of claim 6 wherein the at least one user action is one of a group consisting of: skipping over a segment of the stream of the media item during playback, skipping to a segment of the stream of the media item during playback, repeating playback of a segment of the stream of the media item during playback, and fast-forwarding through a segment of the stream of the media item during playback.

8. A method of operation of a user device comprising:
   receiving a stream of a media item from a streaming media source;
   providing playback of the stream of the media item;
   obtaining one or more look-ahead segments of the media item, wherein the one or more look-ahead segments are one or more segments of the media item that have not yet been streamed to the user device selected based on information that describes content of the one or more look-ahead segments and wherein the information is not indicative of a location of the one or more look-ahead segments in the media item; and
   storing the one or more look-ahead segments in local storage of the user device;
   wherein obtaining the one or more look-ahead segments of the media item comprises:
      selecting the one or more look-ahead segments based on the information that describes the content of the one or more look-ahead segments; and
      prefetching the one or more look-ahead segments from the streaming media source: and
   wherein selecting the one or more look-ahead segments comprises selecting the one or more look-ahead segments based on the information that describes the content of the one or more look-ahead segments and a profile of a user of the user device obtained from a social networking service.

9. The method of claim 1 further comprising prioritizing the one or more look-ahead segments to assign a priority to each of the one or more look-ahead segments.

10. The method of claim 9 wherein prefetching the one or more look-ahead segments comprises, for each look-ahead segment:

allocating an amount of an available bandwidth to the look-ahead segment based on a priority assigned to the look-ahead segment; and prefetching the look-ahead segment from the streaming media source using the amount of available bandwidth allocated to the look-ahead segment.

11. The method of claim 1 wherein prefetching the one or more look-ahead segments comprises, for each look-ahead segment from the one or more look-ahead segments, prefetching a complete version of the look-ahead segment from the streaming media source.

12. The method of claim 1 wherein prefetching the one or more look-ahead segments comprises, for each look-ahead segment from the one or more look-ahead segments, prefetching a portion of the look-ahead segment from the streaming media source.

13. The method of claim 1 wherein prefetching the one or more look-ahead segments comprises, for each look-ahead segment from the one or more look-ahead segments, prefetching a version of the look-ahead segment from the streaming media source having a quality essentially equal to that of the stream of the media item received by the user device.

14. The method of claim 1 wherein prefetching the one or more look-ahead segments comprises, for each look-ahead segment from the one or more look-ahead segments, prefetching a low-quality version of the look-ahead segment from the streaming media source.

15. The method of claim 1 wherein prefetching the one or more look-ahead segments comprises, for each look-ahead segment from the one or more look-ahead segments:
    selecting one of a plurality of versions of the look-ahead segment based on a priority assigned to the look-ahead segment, each of the plurality of versions of the look-ahead segment being a different quality version of the look-ahead segment; and
    prefetching the one of the plurality of versions of the look-ahead segment from the streaming media source.

16. The method of claim 15 wherein selecting the one of the plurality of versions of the look-ahead segment comprises selecting the one of the plurality of versions of the look-ahead segment based on the priority assigned to the look-ahead segment and a bandwidth requirement for delivering each of the plurality of versions of the look-ahead segment.

17. A user device comprising:
    a local storage;
    a communication interface communicatively coupling the user device to a streaming media source via a network; and
    a control system associated with the communication interface and adapted to:
        receive a stream of a media item from the streaming media source;
        provide playback of the stream of the media item;
        obtain one or more look-ahead segments of the media item, wherein the one or more look-ahead segments are one or more segments of the media item that have not yet been streamed to the user device selected based on information that describes content of the one or more look-ahead segments and wherein the information is not indicative of a location of the one or more look-ahead segments in the media item; and
        store the one or more look-ahead segments in the local storage of the user device;
    wherein in order to obtain the one or more look-ahead segments of the media item, the control system is further adapted to:
        select the one or more look-ahead segments based on the information that describes the content of the one or more look-ahead segments; and prefetch the one or more look-ahead segments from the streaming media source; and
    wherein in order to select the one or more look-ahead segments, the control system is further adapted to select the one or more look-ahead segments from a plurality of segments of the media item that have not yet been streamed to the user device based on a comparison of information describing content of the plurality of segments of the media item and user preferences of a user of the user device.

18. A method of operation of a streaming media source comprising:
    receiving a request for a media item from a user device via a network;
    streaming the media item to the user device via the network;
    selecting one or more segments of the media item as one or more look-ahead segments to push to the user device, wherein the one or more look-ahead segments are one or more segments of the media item that have not yet been streamed to the user device selected based on information that describes content of the one or more look-ahead segments and wherein the information is not indicative of a location of the one or more look-ahead segments in the media item; and
    pushing the one or more look-ahead segments to the user device via the network;
    wherein selecting the one or more look-ahead segments comprises selecting the one or more look-ahead segments from a plurality of segments of the media item that have not yet been streamed to the user device based on a comparison of information describing content of the plurality of segments of the media item and user preferences of a user of the user device.

19. The method of claim 18 wherein selecting the one or more segments of the media item as the one or more look-ahead segments further comprises adaptively updating the one or more segments selected as the one or more look-ahead segments based on user actions taken by the user of the user device during playback of the stream of the media item.

20. A streaming media source comprising:
    one or more storage devices:
    a communication interface communicatively coupling the streaming media source to a user device via a network; and
    a control system associated with the communication interface and the one or more storage devices and adapted to:
        receive a request for a media item from the user device;
        stream the media item to the user device from the one or more storage devices;
        select one or more segments of the media item as one or more look-ahead segments to push to the user device, wherein the one or more look-ahead segments are one or more segments of the media item that have not yet been streamed to the user device selected based on information that describes content of the one or more look-ahead segments and wherein the information is not indicative of a location of the one or more look-ahead segments in the media item; and
        push the one or more look-ahead segments to the user device;

wherein in order to select the one or more look-ahead segments, the control system is further adapted to select the one or more look-ahead segments from a plurality of segments of the media item that have not yet been streamed to the user device based on a comparison of information describing content of the plurality of segments of the media item and user preferences of a user of the user device.

21. The streaming media source of claim 20 wherein the control system is further adapted to adaptively update the one or more segments selected as the one or more look-ahead segments based on user actions taken by the user of the user device during playback of the stream of the media item.

* * * * *